No. 610,350. Patented Sept. 6, 1898.
H. FOERSTER.
MEANS FOR SUPPLYING ELECTRIC CURRENTS TO AGRICULTURAL MACHINES.
(Application filed Jan. 8, 1896.)
(No Model.) 4 Sheets—Sheet 1.
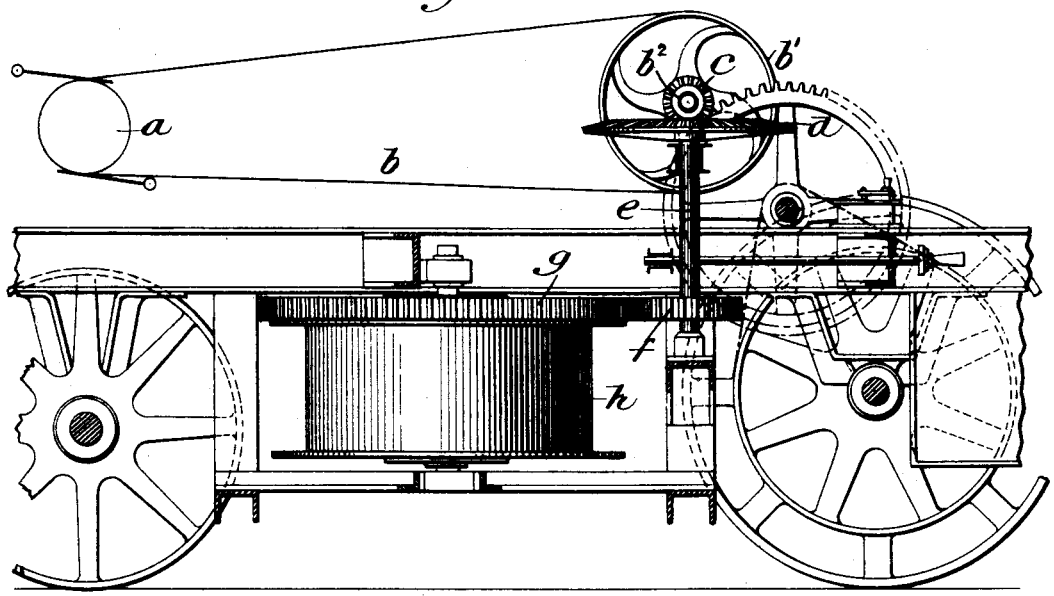
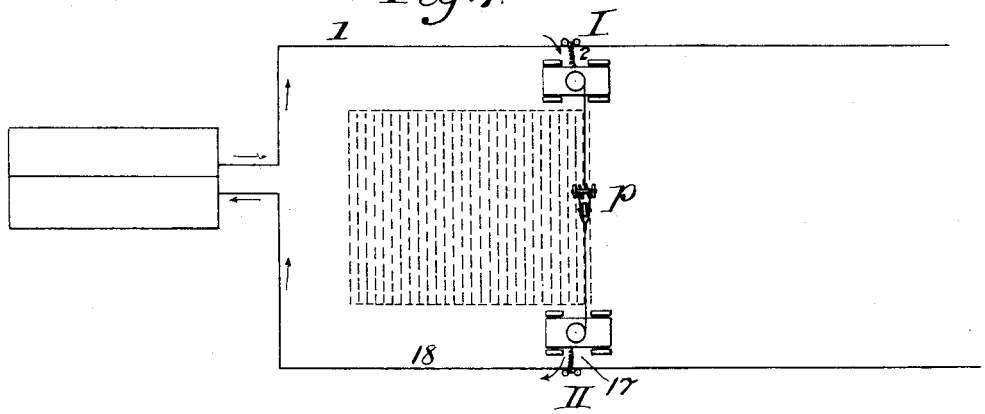
Witnesses.
Inventor.
Hugo Foerster

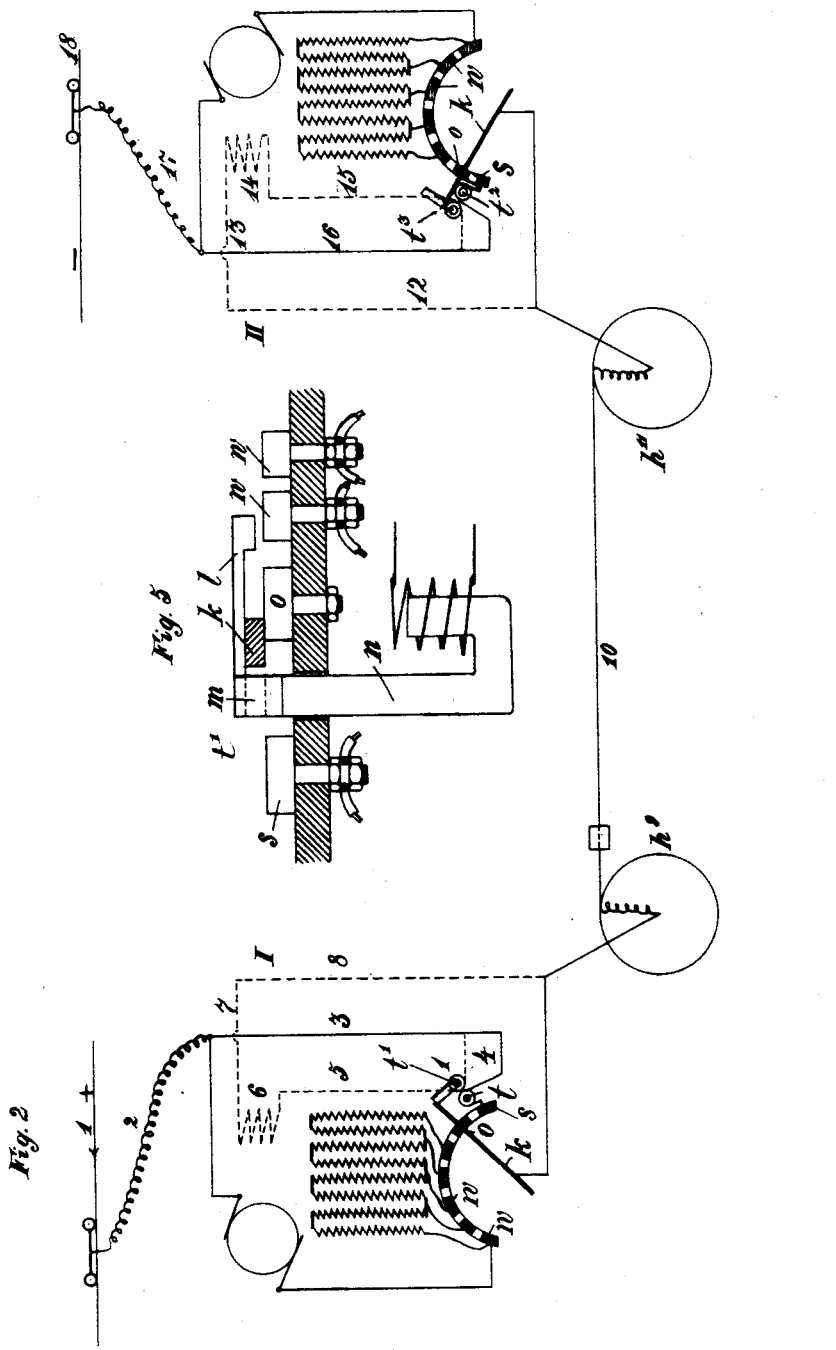

No. 610,350. Patented Sept. 6, 1898.
H. FOERSTER.
MEANS FOR SUPPLYING ELECTRIC CURRENTS TO AGRICULTURAL MACHINES.
(Application filed Jan. 8, 1896.)
(No Model.) 4 Sheets—Sheet 3.
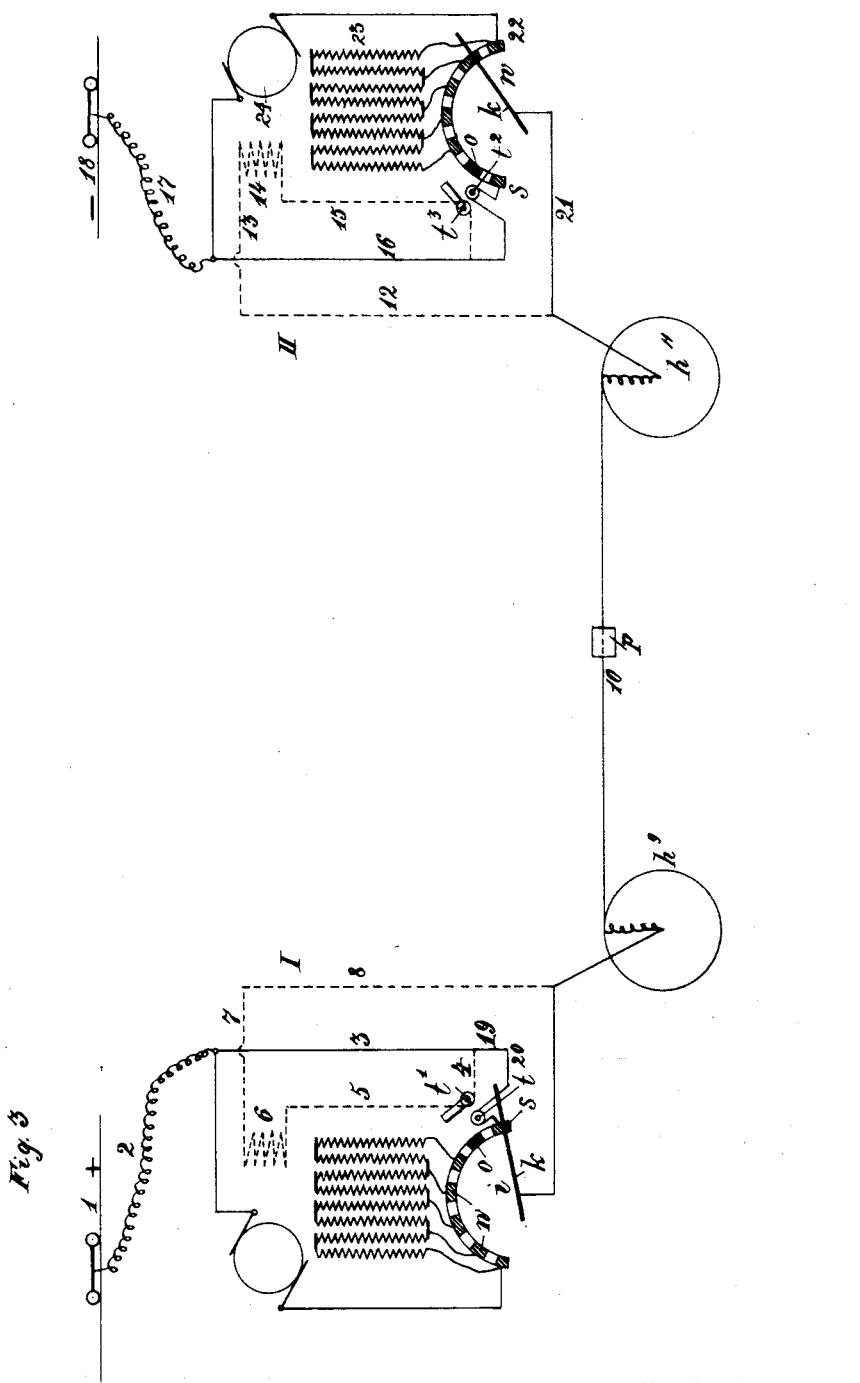
WITNESSES.
INVENTOR
Hugo Foerster
ATTORNEYS.

No. 610,350. Patented Sept. 6, 1898.
H. FOERSTER.
MEANS FOR SUPPLYING ELECTRIC CURRENTS TO AGRICULTURAL MACHINES.
(Application filed Jan. 8, 1896.)
(No Model.) 4 Sheets—Sheet 4.
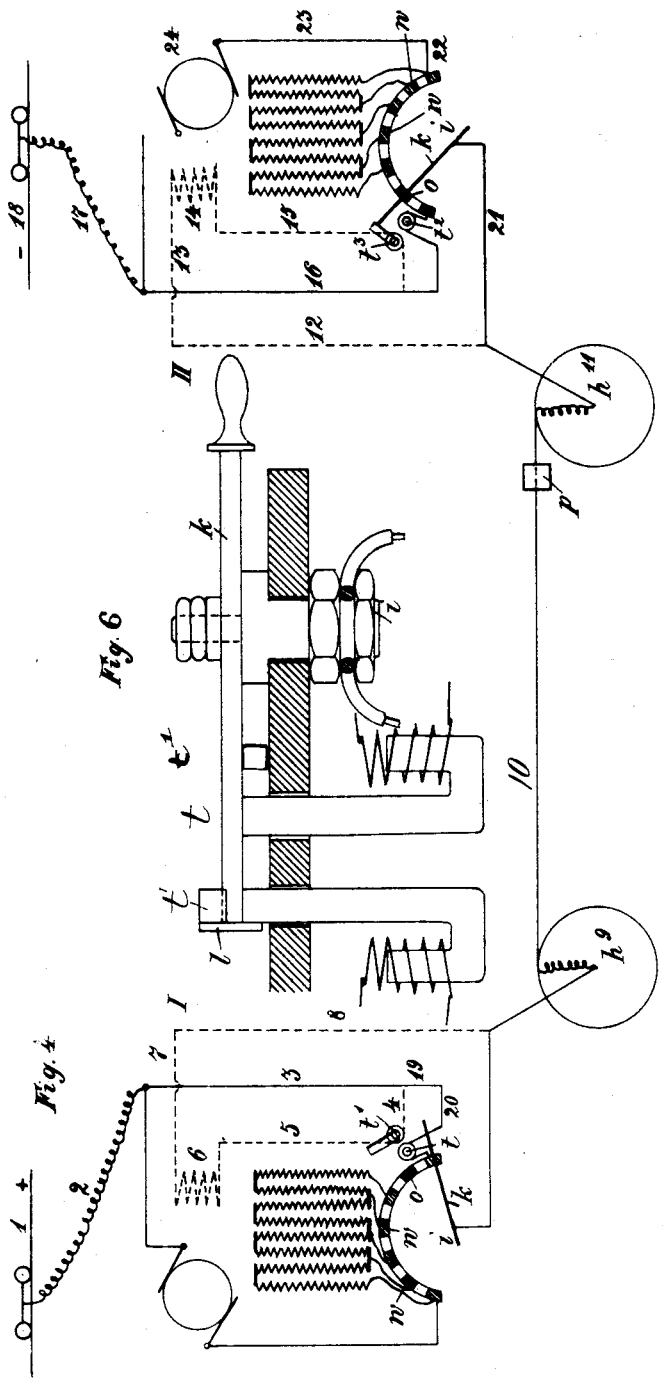
WITNESSES.
INVENTOR
Hugo Foerster
ATTORNEYS.

UNITED STATES PATENT OFFICE.

HUGO FOERSTER, OF GORSDORF, GERMANY.

MEANS FOR SUPPLYING ELECTRIC CURRENTS TO AGRICULTURAL MACHINES.

SPECIFICATION forming part of Letters Patent No. 610,350, dated September 6, 1898.

Application filed January 8, 1896. Serial No. 574,678. (No model.)

*To all whom it may concern:*

Be it known that I, HUGO FOERSTER, a citizen of the Empire of Germany, residing at Gorsdorf, near Jessen, Kingdom of Saxony, Germany, have invented certain new and useful Improvements in Systems of Electric Supply for Electromotors of Agricultural Machines, of which the following is a specification.

This invention relates to an improved system of supplying electric current to agricultural, excavating, and other machines which are to be operated by an electromotor and which system is specially applicable to plows.

Heretofore where plows were moved by electricity the current was supplied in such a manner that at both sides of the field to be plowed there was located an electromotor to which the current was conducted from the generating-dynamo by a double system of line-wires in such a manner as that both electromotors were in circuit independently. This disposition is objectionable for various reasons, inasmuch as a large number of conducting-wires is required, and these wires have to be uniformly stretched, so that the trolley-wagons can pass regularly along the same. Lastly, the arrangement described, by reason of its complicated construction, requires considerable time and money for putting it in use. All of these objections are entirely obviated by my improved system of conducting electric current to such machines, so that electric power, especially for plows, can effectively compete with steam-power.

The invention consists, therefore, in connecting both electromotors with the generating-dynamo by one wire only, while they are connected with each other by the cable by which motion is imparted to the plow. The advantages of this arrangement are obvious, for the reason that by reducing the number of line-wires a considerable saving of material is obtained, while on the other hand the plant and the putting up of the same are simplified, especially as it is not necessary to lay special stress on the stretching of the line-wires when the trolleys have a regular contact with the line. Lastly, the putting up of the line can be accomplished at a considerable saving of time and labor, which is an essential feature with machines which are used in the open field and in which the entire plant has to be frequently moved so as to bring the plow in a new position.

In the accompanying drawings, Figure 1 represents a side elevation of a motor-wagon used in my improved system of supplying the electric current to plows and other agricultural machinery. Figs. 2 3 and 4 are diagrams showing the course of the current in the different positions of the coöperating parts of the apparatus. Figs. 5 and 6 are sectional details of the switch device. Fig. 7 is a diagrammatic view showing the system as applied to a field to be plowed.

Similar letters and figures of reference indicate corresponding parts.

Referring to the drawings, $a$ represents an electromotor suitably supported on the motor-wagon and from which extends a motion-transmitting belt $b$ to a pulley $b'$ on a shaft $b^2$, mounted on the motor-wagon. On the shaft $b^2$ is arranged a bevel-pinion $c$, which meshes with a large bevel-wheel $d$, that carries on its shaft $e$ a gear-wheel $f$, which meshes with a larger gear-wheel that is applied to the upper part of a drum $h$, around which the wire rope or cable 10 for the plow $p$ is wound. The plow $p$ is connected in any suitable manner to the draft rope or cable, as clearly shown in Fig. 7.

At both sides of the field to be plowed is arranged a motor-wagon of the construction shown in Fig. 1 and just described. The electromotors are constructed as shunt-motors and are connected with each other by the draft-rope, which passes around the drum of each motor-wagon, so that the electromotors are placed in electric connection with each other. The wire rope or cable is made of steel wire and is provided with a core of copper wire of suitable thickness for reducing the resistance. If the arrangement were simply made in the manner described, it would be possible that the two electromotors could be started independently by the attendants, so that consequently both motors would commence to work simultaneously and would thereby impart to the cable a simultaneous strain in opposite direction. For avoiding this objection a locking device is used by which the switch-lever of one electromotor is limited in its motion in such a manner that said electromotor belonging to one motor-wagon cannot be switched into the circuit when the current passes through the second electromotor, so that the plow is thereby pulled along.

In order to illustrate this construction clearly, reference is made to Figs. 2 to 6, inclusive. As in the plows with electric propelling devices heretofore known so also in the present invention a primary or generating dynamo is used, from which the current is supplied to two electromotors for winding up the draft rope or cable to which the plow or other agricultural machine is attached. The electromotors are dynamos which are controlled by switch-levers, the field-magnets of which are shown in dotted lines as connected in series with the main circuit, while the armature-coils are connected with the ends of the line-wires. (Shown in full lines.) The locking devices referred to consist, essentially, of solenoids whose cores or parts actuated thereby form the stops which prevent the shifting of the switch-lever when the current passing through one of the solenoids is strong enough to raise its core and bring it into the path of the said switch-lever.

The switch-lever $k$ can assume three different positions: First, the switch-lever can be placed over one of the resistance-contacts $w$, which contacts are arranged concentrically to its pivot, in which case the electromotor which belongs to the switch device is in the circuit and operated with greater or less resistance, according as the switch-lever is moved nearer to one or the other of the end contacts of the series of resistance-contacts, as shown in Fig. 3; second, the switch-lever $k$ can be placed on a so-called "blind" contact or insulating zero-block $a$, in which case the motor is set at rest, as shown in Fig. 2, and, third, the switch-lever $k$ can assume the position shown at the left in Fig. 4, in which short-circuiting takes place and the electromotor is switched out of the circuit.

Each switch device is provided with two magnetic locking devices, that at station I with locking devices $t$ $t'$ and that at station II with locking devices $t^2 t^3$, of which the locking devices $t$ $t^2$ lock the switch-lever $k$ as soon as it is placed in the short-circuiting position, while the locking devices $t'$ $t^3$ prevent the placing of the switch-lever $k$ into the short-circuiting position as soon as the same is placed over one of the resistance-contacts $w$. It is to be first supposed that the dynamos at station I as well as at station II are in a position of rest, in which case the switch-levers $k$ rest on the insulated zero-blocks, as shown in Fig. 2. The current from the primary dynamo or generator can then pass by the main wire 1 over the trolley of the wagon at station I to the line-wire 2 from the same, over wires 3 4, locking device $t'$, wire 5, field-magnet coils 6, motor-wires 7 8, drum $h^9$, draft-rope 10, drum $h^{11}$, wire 12 at station II, then over wire 13 to the field-magnet coils 14, wire 15, locking device $t^3$, wires 16 17, then over the trolley to wire 18, and thence back to the generating-dynamo. As both switch-levers $k$ are brought to rest on their corresponding zero-blocks the locking devices $t$ and $t^2$ are switched out of circuit, while the locking devices $t'$ and $t^3$ cannot be called into action, as the field-magnet coils of both motors are switched in series and present so great a resistance that the current is not sufficiently strong for operating the locking devices $t'$ $t^3$. Therefore the latter remain in their lower positions, so that the switch-levers $k$ of both stations could have free play in either direction when the switch-levers are upon the zero-blocks if the locking devices $t'$ $t^3$ were not so constructed as to prevent it.

The separate parts of the locking devices are clearly shown in Figs. 5 and 6. The solenoid-core $n$ of each of the locking devices $t'$ and $t^3$ is provided with a side recess $m$, as apparent from dotted lines in Fig. 5, by which the switch-lever $k$ is enabled when the core is lowered to pass to the short-circuiting contacts $s$, while a hook-shaped latch $l$ at the upper end of the core prevents the shifting of the switch-lever in the direction of the resistances $w$. The consequence of this is that when the switch-levers are placed at both stations on the zero-blocks they can be shifted into the short-circuiting position $s$, but cannot be shifted in the direction of the resistances $w$. If one of the attendants now takes hold of his switch-lever $k$ and places it in the short-circuiting position upon the contact $s$, as shown in Fig. 3, then the current flows over the line-wire 1, wire 2 of station I, wires 3, 19, and 20 to the locking device $t$, over the switch-lever $k$ to the drum $h^9$, draft-rope 10, drum $h^{11}$, wires 12 13, field magnetic coils 14, wire 15, locking device $t^3$, wires 16, 17, and 18, and back to the primary dynamo. The locking device $t^3$ is now placed in action and in consequence thereof the iron core $n$, which belongs to the same, is raised, so that the hook-shaped part $l$ permits the lever $k$ to be moved over onto the resistances $w$, while at the same time by the core $n$ a shifting of the switch-lever $k$ to the short-circuiting contact is prevented. The switch-lever in station I is therefore locked in the short-circuiting position and the switch-lever at station II in the resistance position. The attendant at station II then moves the lever $k$ onto the resistances $w$, so that the current instead of flowing through the field-magnet coils 14 flows from wire 21 over the switch-lever $k$, resistances $w$, wires 22 23 to armature 24, and from thence over wires 17 and 18 to the primary dynamo. The motor in station II is thereby set into action and pulls the plow $p$ from the motor-wagon at station I to the motor-wagon at station II. The shunt-locking device $t'$ of station I is not now in action, as only a very weak current passes through the solenoid thereof, while the locking device $t$, which is supplied with the stronger current, is in full action. When the plow $p$ is moved sufficiently toward station II, the attendant thereat observes this, or he may, however, be notified by a suitable electric bell. The attendant then grasps his switch-lever $k$ and places it in the zero position, so that the current flows into the parts according to Fig. 4. In station I the switch-lever $k$ is still in the short-circuiting position and the locking devices $t\,t'$ are placed out of action, $t'$ because it is short-circuited and $t$ because in station II the current flows only through the field-magnet coils 14, which are switched in series, so that the line has such a great resistance that the solenoid belonging to the locking device $t$ receives too weak a current. In station II the locking device $t^2$ is placed out of action and the locking device $t^3$ is placed into action and raised, inasmuch as its coils are switched in series with the coils of the field-magnets and it does not require as strong a current to excite as would be necessary for the locking device $t'$ of station I. The attendant in station II can therefore in this position of the parts shift his switch-lever $k$ on the resistances $w$, but he cannot bring it into short-circuiting position. The short circuit at both stations, as well as the placing of the motors at both stations into simultaneous action, is therefore effectively prevented. This feature forms an important advantage when it is considered that in field-work men have to be employed who do not have the necessary practice and experience to attend to the switch-levers according to the instructions given them, and this lack of experience might result in considerable damage to the plant.

Having thus described my invention, I claim as new and desire to secure by Letters Patent—

1. In a system of electric supply for electromotors of agricultural machines, the combination with a plow and its draft-rope, of a primary generating-dynamo, and two electromotors for operating the plow or other machine, which electromotors are connected by a single line-wire with the dynamo and which are placed in electrical connection with each other by the draft-rope of the plow, substantially as set forth.

2. In a system of electric supply for electromotors of agricultural machines, the combination with the electromotors of each station, with a switch device for each motor, having in circuit two magnetic locking devices for the switch-lever, constructed to permit the switch-lever of one electromotor to be placed in short-circuiting position and to simultaneously prevent the switch-lever of the other electromotor from being placed in the short-circuiting position but permit it to be placed in any position on the resistance-contacts of the switch device, substantially as set forth.

In testimony that I claim the foregoing as my invention I have signed my name in presence of two subscribing witnesses.

HUGO FOERSTER.

Witnesses:
  W. HAUPT,
  CHAS. H. DAY.